United States Patent [19]
Otaki et al.

[11] Patent Number: 5,497,200
[45] Date of Patent: Mar. 5, 1996

[54] DIGITAL TIME BASE CORRECTOR

[75] Inventors: Hiroshi Otaki; Masahiro Nakajima, both of Koufu, Japan

[73] Assignees: Pioneer Video Corporation, Yamanashi; Pioneer Electronic Corporation, Tokyo, both of Japan

[21] Appl. No.: 357,750

[22] Filed: Dec. 16, 1994

[30] Foreign Application Priority Data

Dec. 16, 1993 [JP] Japan .................................. 5-316941

[51] Int. Cl.$^6$ ........................................................ H04N 5/95
[52] U.S. Cl. .......................................... 348/497; 358/326
[58] Field of Search ................................. 348/497–498, 348/505, 506, 508, 512, 536, 539, 549; 358/314, 320, 326, 327, 335, 336, 337, 339; H04N 7/00, 11/00, 5/04, 5/12, 5/08, 5/95, 5/953, 5/956

[56] References Cited

U.S. PATENT DOCUMENTS

| | | | |
|---|---|---|---|
| 4,214,262 | 7/1980 | Mizukami | 348/498 |
| 4,339,770 | 7/1982 | Dennison et al. | 348/498 |
| 4,864,387 | 9/1989 | Tatami | 358/326 |
| 4,987,491 | 1/1991 | Kaite et al. | 348/497 |
| 5,245,430 | 9/1993 | Nishimura | 358/314 |

Primary Examiner—James J. Groody
Assistant Examiner—Michael H. Lee
Attorney, Agent, or Firm—Sughrue, Mion, Zinn, Macpeak & Seas

[57] ABSTRACT

A digital time base corrector, when using a memory whose storage capacity is reduced to a value of about 1H of the video signal, can maintain an interleave relation between a luminance signal and a color signal of a video signal even when the writing operation into a memory is delayed by a jitter included in the demodulated video signal. When the read address is advanced from the write address in each of an image data memory and a subcarrier phase memory in one horizontal scan period, a discrepancy occurs between the polarity data read out from the subcarrier phase memory and the proper polarity data held in latch means. When such a discrepancy is detected, the color phase of the read-out image data is inverted. In starting the data reading operation for a new horizontal scan period, if it is detected that the operating mode has not shifted to the data writing operation for the new horizontal scan period, the color phase of the read-out image data is inverted for the new horizontal scan period.

2 Claims, 9 Drawing Sheets

DIGITAL TIME BASE CORRECTOR

BACKGROUND OF THE INVENTION

1. Field of the Invention

The present invention relates to a digital time base corrector for use in an apparatus for reproducing a video signal recorded on a recording medium.

2. Description of Background Information

When a video signal recorded on a video disk is merely demodulated and reproduced, a reproduced video signal may include fine jitter due to eccentric components of the video disc and vibrations caused in the mechanical system of the apparatus, resulting in a time base error which represents a deviation of the reproduction video signal from a reference time base. For correcting the time base error, a digital time base corrector known in which the reproduction video signal is converted to the digital data by an A/D converter, subsequently the digital data is written into a memory and is read out in accordance with the writing order synchronously with a reference timing signal, and the read out data is reconverted to an analog signal by a D/A converter.

A conventional digital time base corrector is, for example, disclosed in Japanese Patent Application Kokai No. 1-93273. In this time base corrector, a phase locked loop (PLL) circuit in which at least one of a horizontal sync signal and a color burst signal is separated and extracted from the reproduction video signal and to which the separation signal is supplied is provided. The PLL circuit generates a clock signal whose phase is synchronized with the time base error included in the reproduction video signal. The clock signal is phase modulated by phase modulating means in accordance with a phase comparison output of phase comparing means in the PLL circuit. The clock signal after completion of the phase modulation is used as a sample timing signal of the A/D converter. The clock signal, consequently, traces even a high frequency component of the time base error, thereby performing the correction.

According to such a digital time base corrector, it is desirable to reduce a memory capacity of a memory to a value of about 1H (H: horizontal scan period) of the video signal in order to realize the low costs. Although read addresses are ordinarily changed in such a way as to follow write addresses which are sequentially designated to write the video signal in the memory, however, in the case where a period of clock signal is largely fluctuated by a jitter included in the demodulated video signal, the writing operation to the memory is delayed and the reading operation which is performed at a predetermined period is advanced from the writing operation with respect to the addresses. When such a situation occurs, since the video signal of 1H before is read out, in case of the video signal of the NTSC system, a condition such that the phase of a color signal is inverted by 180° every 1H is not maintained, so that an interleave relation between a luminance signal and the color signal of the video signal cannot be held.

SUMMARY AND OBJECT OF THE INVENTION

It is, therefore, an object of the invention to provide a digital time base corrector in which in the case where a memory capacity of a memory is reduced to a value of about 1H of a video signal, even when the writing operation to the memory is delayed by a jitter included in the demodulated video signal, an interleave relation between a luminance signal and a color signal of the video signal can be held.

A digital time base corrector according to the present invention comprises: A/D converting means for sampling a color video signal which is read out from a recording medium and reproduced and for converting it to a digital signal; polarity data generating means for generating polarity data indicative of a polarity of a burst signal from the digital signal every horizontal scan period; an image data memory for storing the digital signal as image data on a sample unit basis every horizontal scan period; a subcarrier phase memory having memory locations of the polarity data of the number as many as only the number of image data written in the image data memory; memory control means for controlling in a manner such that the image data is written at memory locations in the image data memory which are sequentially designated in accordance with a write clock signal whose phase is synchronized with a time base fluctuation included in the color video signal, the polarity data is written at memory locations in the subcarrier phase memory which are sequentially designated in accordance with the write clock signal, the image data is read out from the memory locations in the image data memory which are sequentially designated in accordance with a read clock signal of a predetermined period, and the polarity data is read out from the memory locations in the subcarrier phase memory which are sequentially designated in accordance with the read clock signal; latch means for holding and generating the polarity data formed by the polarity data generating means for a period of time of the reading operation of the memory control means corresponding to the horizontal scan period in which the polarity data is generated; first discrepancy detecting means for generating a first discrepancy detection signal when a discrepancy between the polarity data read out by the memory control means and the polarity data held in the latch means is detected; second discrepancy detecting means for generating a second discrepancy detection signal for a new horizontal scan period when it is detected that the memory control means is not shifted to the data writing operation of a new horizontal scan period in the case where the memory control means starts the data reading operation from the image data memory and the subcarrier phase memory for the new horizontal scan period; color phase inverting means for relaying the image data read out by the memory control means and for inverting a color phase of the image data read out by the memory control means in accordance with the first or second discrepancy detection signal and for relaying the phase inverted image data; and means for generating an analog video signal on the basis of the image data outputted from the color phase inverting means.

According to the digital time base corrector of the invention, when the read addresses are advanced from the write addresses in the image data memory and the subcarrier phase memory, a discrepancy occurs between the polarity data read out from the subcarrier phase memory and the proper polarity data held in the latch means. When the discrepancy is detected, the first discrepancy detection signal is generated and the color phase of the read-out image data is inverted. In the case where the data reading operations from the image data memory and the subcarrier phase memory for the new horizontal scan period are started, when it is detected that the memory control means is not shifted to the data writing operation of the new horizontal scan period, the second discrepancy detection signal is generated and the color phase of the read-out image data is inverted in the new horizontal scan period.

DETAILED DESCRIPTION OF THE PREFERRED EMBODIMENT

An embodiment of the invention will now be described in detail hereinbelow with reference to the drawings.

Figure 1:
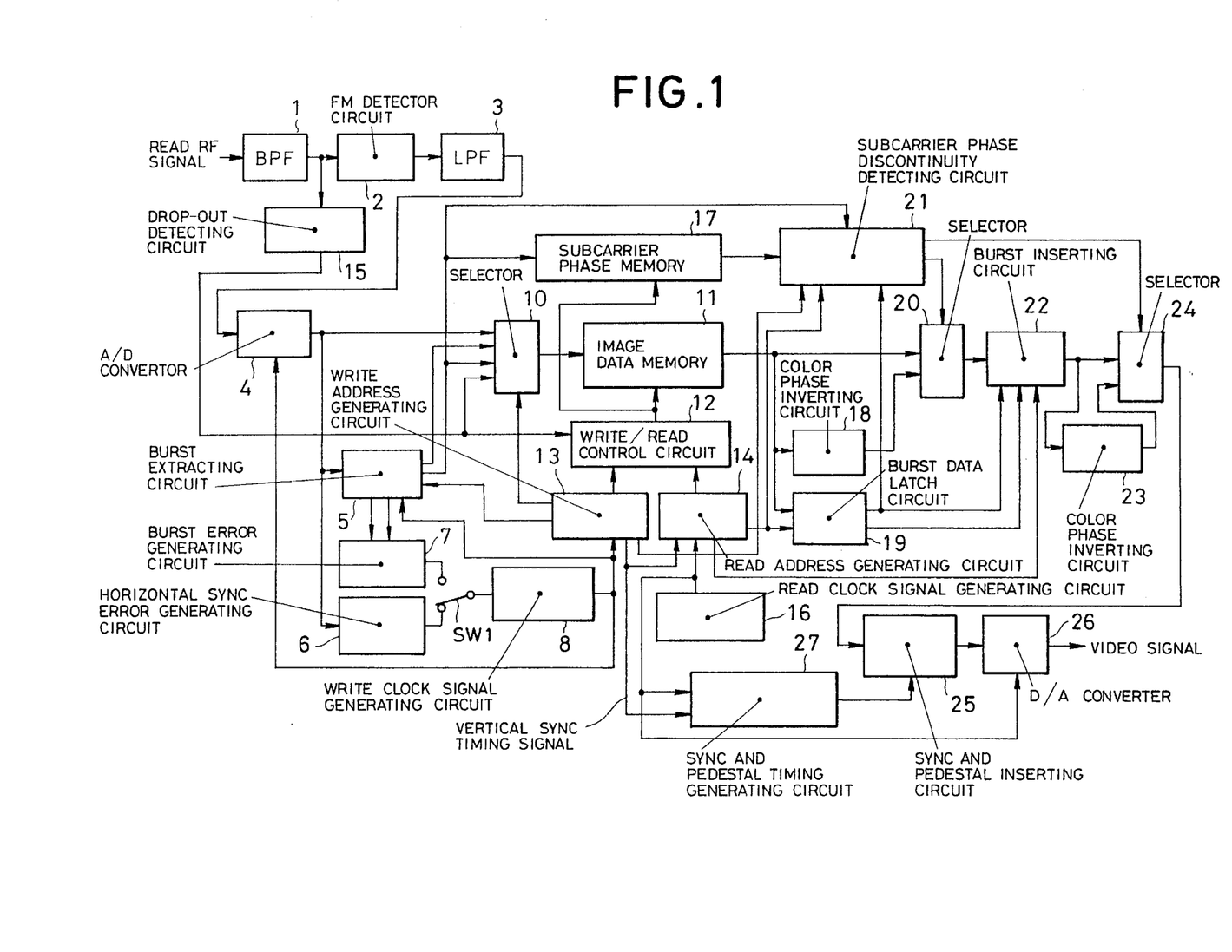
FIG. 1 is a block diagram showing an embodiment of the invention.
Figure 2:
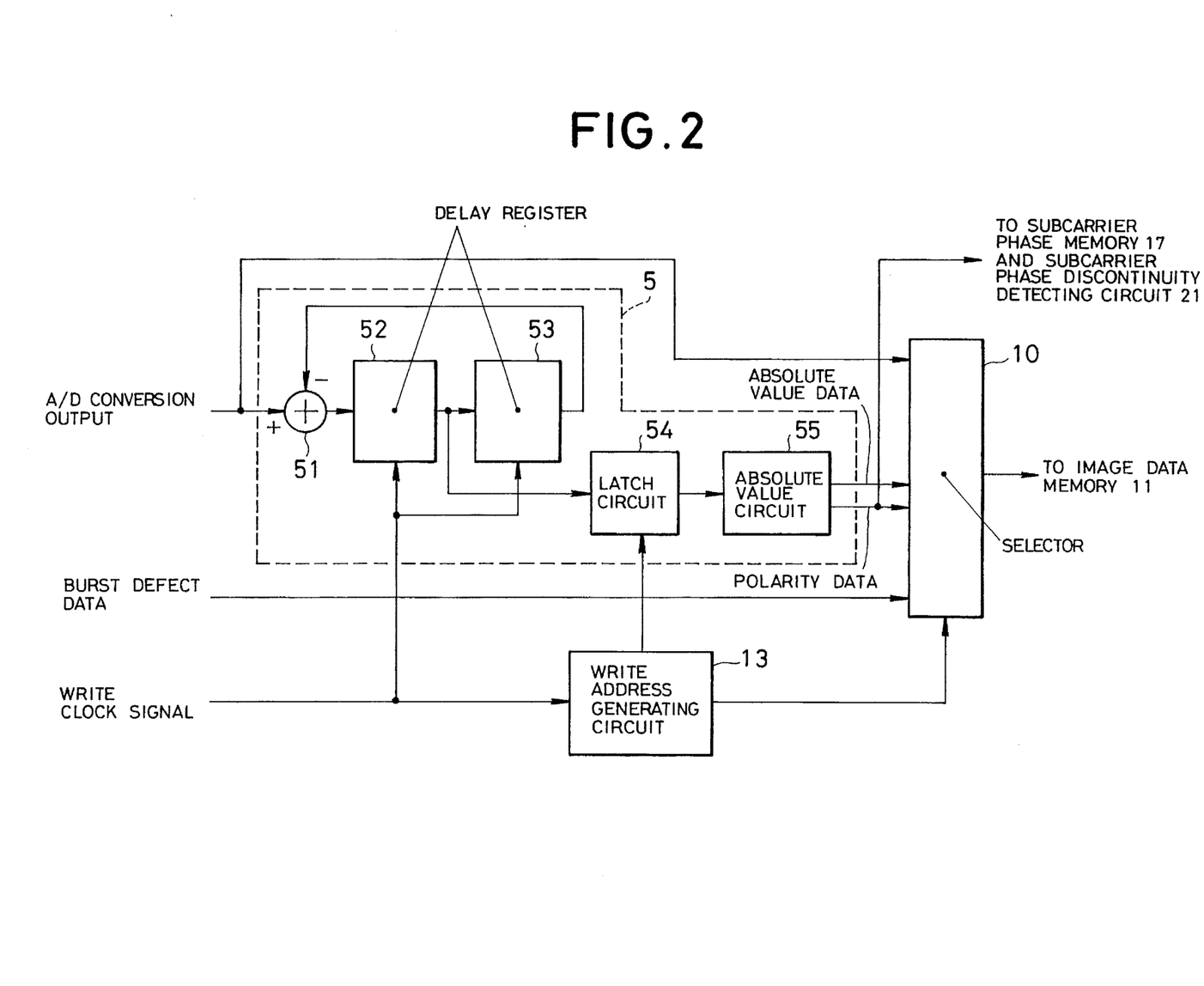
FIG. 2 is a block diagram specifically showing a portion of a burst extracting circuit.

FIG. 1 shows a digital time base corrector according to the invention. In the digital time base corrector, a read RF signal outputted from a pickup (not shown) of a video disk player is supplied to a BPF (band pass filter) 1, by which only a video signal band component is obtained and is supplied to an FM detector circuit 2. A composite video signal demodulated by the FM detector circuit 2 is supplied to an A/D converter 4 through an LPF (low pass filter) 3. The A/D converter 4 generates a digital video signal and the digital video signal is video data of every pixel. A conversion output of the A/D converter 4 is connected to a burst extracting circuit 5 and a horizontal sync error generating circuit 6. The burst extracting circuit 5 generates a color burst signal component in the digital video signal outputted from the A/D converter 4 as a SIN (sine) component signal and a COS (cosine) component signal and has a construction to obtain a polarity of the burst signal and an absolute value of its amplitude from the COS component signal. In the burst extracting circuit 5, as shown in FIG. 2, a subtracter 51 is provided for the output of the A/D converter 4 in order to obtain the polarity and the absolute value of the amplitude. The digital video signal outputted from the A/D converter 4 is received to one positive (+) input of the subtracter 51. An output signal of the subtracter 51 is supplied to the other negative (−) input of the subtracter 51 through two delay registers 52 and 53. A write clock signal is supplied to the delay registers 52 and 53, by which the digital video signal is delayed by the time of two samples. A latch circuit 54 is connected to an output of the delay register 52. The latch circuit 54 holds a sample of the burst signal at a predetermined position in 1H (horizontal scan period) of the video signal in accordance with the burst timing signal and supplies to an absolute value circuit 55. The absolute value circuit 55 obtains the polarity of the burst signal and the absolute value of its amplitude from the data held in the latch circuit 54. The burst signal is held as data of predetermined bits in the latch circuit 54 and the MSB (most significant bit) is the polarity data and the bits lower than the MSB are set to absolute value data.

The SIN component signal and COS component signal outputted from the burst extracting circuit 5 are supplied to a burst error generating circuit 7. The burst error generating circuit 7 calculates a TAN component signal by dividing the SIN component signal by the COS component signal and retrieves an angle component as a burst error signal from the TAN component signal by using a table which has been predetermined in a memory (not shown).

The horizontal sync error generating circuit 6 separates and extracts a horizontal sync signal component in the digital video signal outputted from the A/D converter 4, thereby calculating the horizontal sync error signal from the separated and extracted horizontal sync signal component by an error arithmetic operating circuit including a loop circuit by a PLL.

A change-over switch SW1 is connected to each output of the horizontal sync error generating circuit 6 and the burst error generating circuit 7. The change-over switch SW1 selectively relays either one of the burst error signal and the horizontal sync error signal to a write clock signal generating circuit 8 in accordance with a switching signal from a switch control circuit, which will be described hereinafter. For instance, in the case where conditions such that a tracking servo loop is in a closed state and the loop circuit in the horizontal sync error generating circuit 6 is in a locking state are continued for 3H or longer, an output signal of the burst error generating circuit 7 is relayed to the write clock signal generating circuit 8. The write clock signal generating circuit 8 comprises a PLL circuit and generates a write clock signal in accordance with the horizontal sync error signal or burst error signal. The write clock signal is supplied to the A/D converter 4 and a write address generating circuit 13, which will be described hereinafter.

An image data memory 11 is connected to the output of the A/D converter 4 through a selector 10. The image memory 11 is constructed by an FIFO (First-In First-Out) and has memory locations to store video data of 768 pixels smaller than 910 pixels of 1H. The writing and reading operations of data to/from the image data memory 11 are controlled by a write/read control circuit 12. A write address generating circuit 13 for generating write address data to designate a writing memory location in the image data memory 11 and a read address generating circuit 14 for generating read address data to designate a reading memory location are connected to the write/read control circuit 12.

A drop-out detecting circuit 15 for detecting a drop-out is connected to an output terminal of the BPF 1. A detection output of the drop-out detecting circuit 15 is supplied to the selector 10 and the write/read control circuit 12. In addition to the digital video signal from the A/D converter 4 and the detection output of the drop-out, the polarity data and the absolute value data are supplied from the latch circuit 54 to the selector 10. The detection output of the drop-out is supplied as burst defect data which is the drop-out detection signal of the burst signal. The selector 10 selectively relays and generates either one of the video data, burst defect data, and burst compression data comprising the polarity data and the absolute value data to the image data memory 11 in accordance with the selection timing signal.

A subcarrier phase memory 17 is connected to a polarity data output of the latch circuit 54. The subcarrier phase memory 17 has memory locations to store the polarity data of only the number as many as the number (for example, 768) of video data stored in the image data memory 11 and the writing and reading operations are controlled by the write/read control circuit 12. The image data memory 11 and the subcarrier phase memory 17 have the memory locations which correspond to each other. When write address data is generated by the write address generating circuit 13, the mutually corresponding memory locations in the image data memory 11 and subcarrier phase memory 17 are designated by the write address data. Similarly, when read address data is generated by the read address generating circuit 14, the mutually corresponding memory locations in the image data memory 11 and subcarrier phase memory 17 are designated by the read address data.

Figure 3:
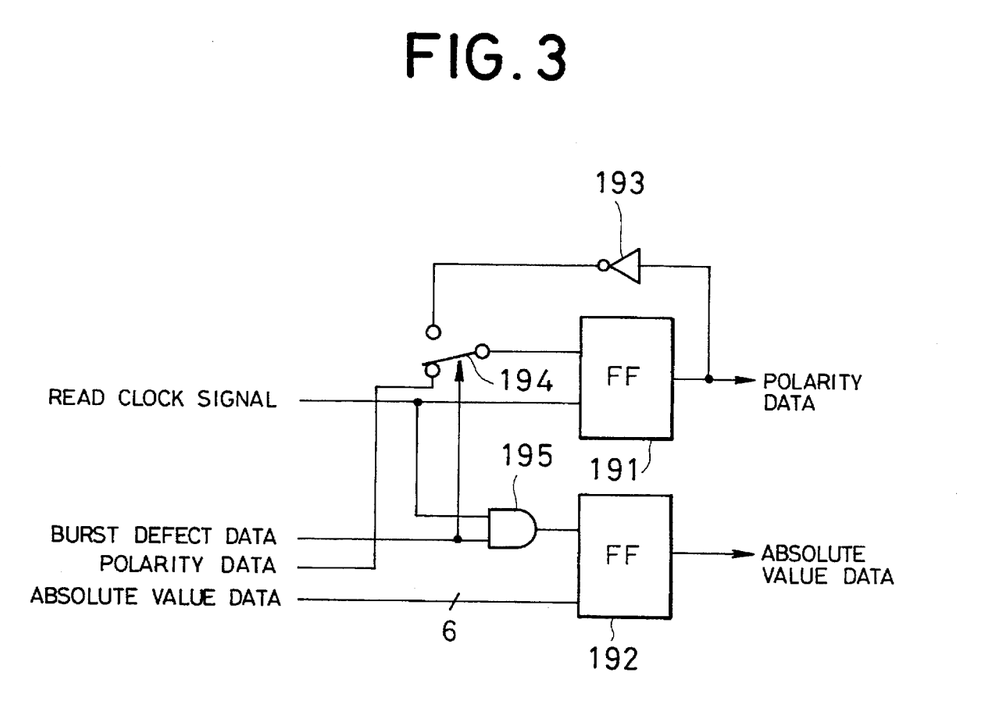
FIG. 3 is a block diagram specifically showing a burst data latch circuit.

A read output of the image data memory 11 is connected to a color phase inverting circuit 18, a burst data latch circuit 19, and a selector 20. The color phase inverting circuit 18 inverts a color phase of the video data read out from the image data memory 11 and supplies the video data whose color phase was inverted to the selector 20. The burst data latch circuit 19 holds the polarity data and the absolute value data which were read out from the image data memory 11. As shown in FIG. 3, in the burst data latch circuit 19, flip-flops (FFs) 191 and 192 are provided as latch elements. A read 1H clock signal is supplied as a latch timing signal from the read address generating circuit 14 to one input terminal of the FF 191. The polarity data read out from the image data memory 11 or the data obtained by inverting the polarity data outputted from the FF 191 by an invertor 193 is selectively supplied from a change-over switch 194 to the other input terminal. The change-over switch 194 performs a switching operation in accordance with the contents of the burst defect data read out from the image data memory 11. An AND circuit 195 is connected to one input terminal of the FF 1920 The AND circuit 195 obtains the AND between the read 1H clock signal and the read-out burst defect data and supplies the AND as a latch timing signal to the FF 192. The absolute value data read out from the image data memory 11 is supplied to the other input terminal of the FF 192. Output data of the FF 191 is used as polarity data and output data of the FF 192 is used as absolute value data.

The selector 20 selectively relays and generates either one of the video data read out from the image data memory 11 and the color phase inverted video data from the color phase inverting circuit 18. A selection signal of the selector 20 is supplied from a subcarrier phase discontinuity detecting circuit 21, which will be described hereinafter.

Figure 4:
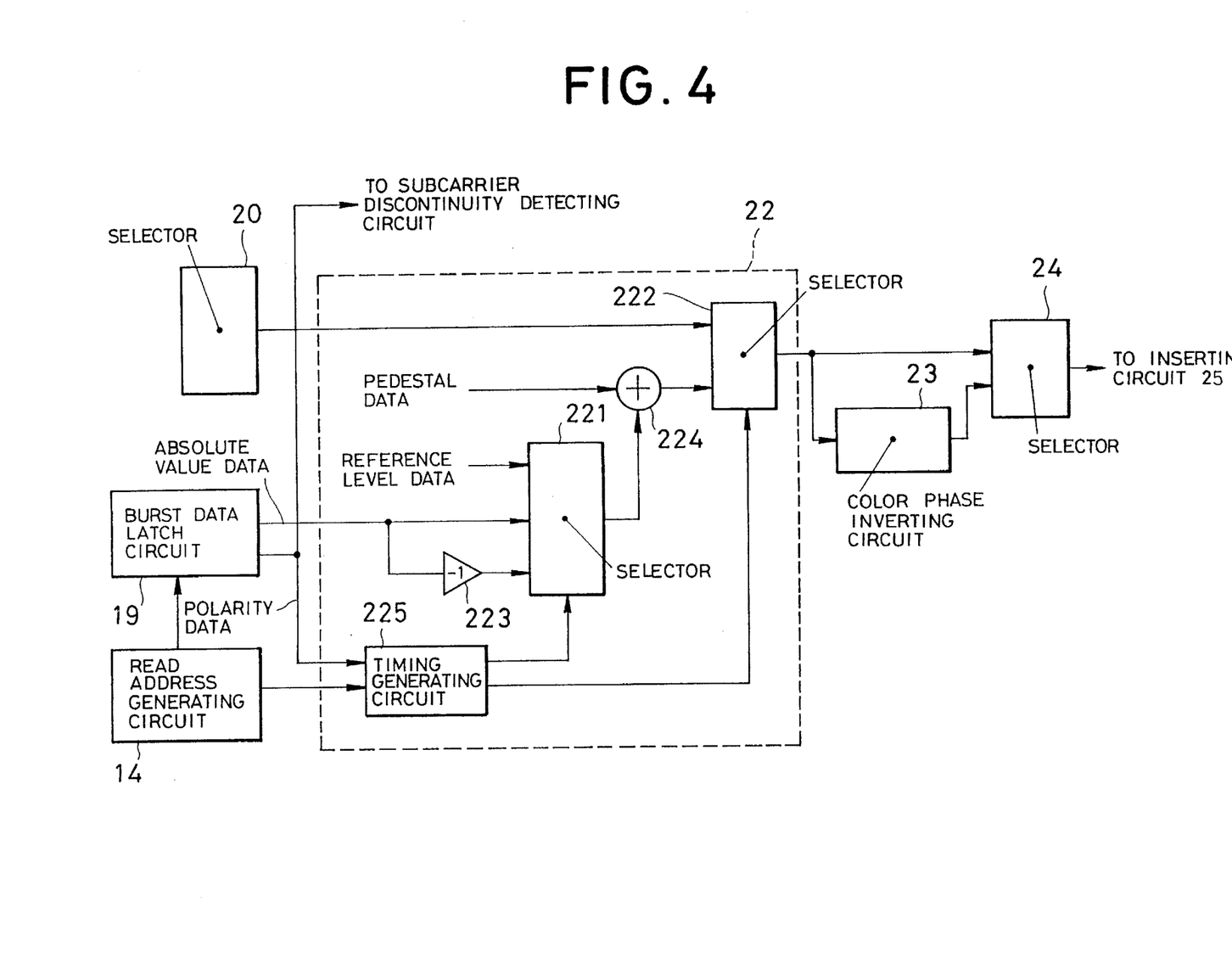
FIG. 4 is a block diagram specifically showing a burst inserting circuit.

A burst inserting circuit 22 to insert a burst component into the video data is connected to each output of the burst data latch circuit 19 and selector 20. As shown in FIG. 4, two selectors 221 and 222 are provided in the burst inserting circuit 22. The selector 221 selectively relays and generates either one of the absolute value data held in the burst data latch circuit 19, output data of a multiplier 223 to multiple "−1" to the absolute value data, and reference level data indicative of the 0 level to an adder 224. The adder 224 adds pedestal data indicative of a pedestal level to the data which is outputted from the selector 221 and supplies as burst data to the selector 222. The selector 222 selectively relays and generates the video data from the selector 20 or the burst data from the adder 224. A timing generating circuit 225 is provided for the burst inserting circuit 22 in order to control a selection timing each of the selectors 221 and 222. The timing generating circuit 225 generates a first selection timing signal for the selector 221 on the basis of a count value of a counter which is outputted from the read address generating circuit 14 and the polarity data held in the burst data latch circuit 19 and generates a second selection timing signal for the selector 222 on the basis of the read clock signal outputted from the read address generating circuit 14.

A color phase inverting circuit 23 and a selector 24 are connected to an output of the selector 222 which is used as an output of the burst inserting circuit 22. The color phase inverting circuit 23 inverts the color phase of the video data including the burst component which is relayed and outputted from the selector 222 and supplies the color phase inverted video data to the selector 24. The selector 24 selectively relays and outputs either one of the video data including the burst component which was relayed and outputted from the selector 222 and the color phase inverted video data from the color phase inverting circuit 23. A selection signal of the selector 24 is supplied from the subcarrier phase discontinuity detecting circuit 21.

A D/A converter 26 is connected to an output of the selector 24 through a sync and pedestal inserting circuit 25. The sync and pedestal inserting circuit 25 forms a digital composite video signal by adding horizontal and vertical sync components and a pedestal component to the video data including the burst component outputted from the selector 24. The timing to add the horizontal and vertical sync components and the pedestal component is controlled by a sync and pedestal timing generating circuit 27. A vertical sync timing signal is supplied from the write address generating circuit 13 to the timing generating circuit 27. A horizontal sync timing signal is also supplied from the read address generating circuit 14 to the timing generating circuit 27. The D/A converter 26 converts the digital composite video signal to an analog composite video signal.

Figure 5:
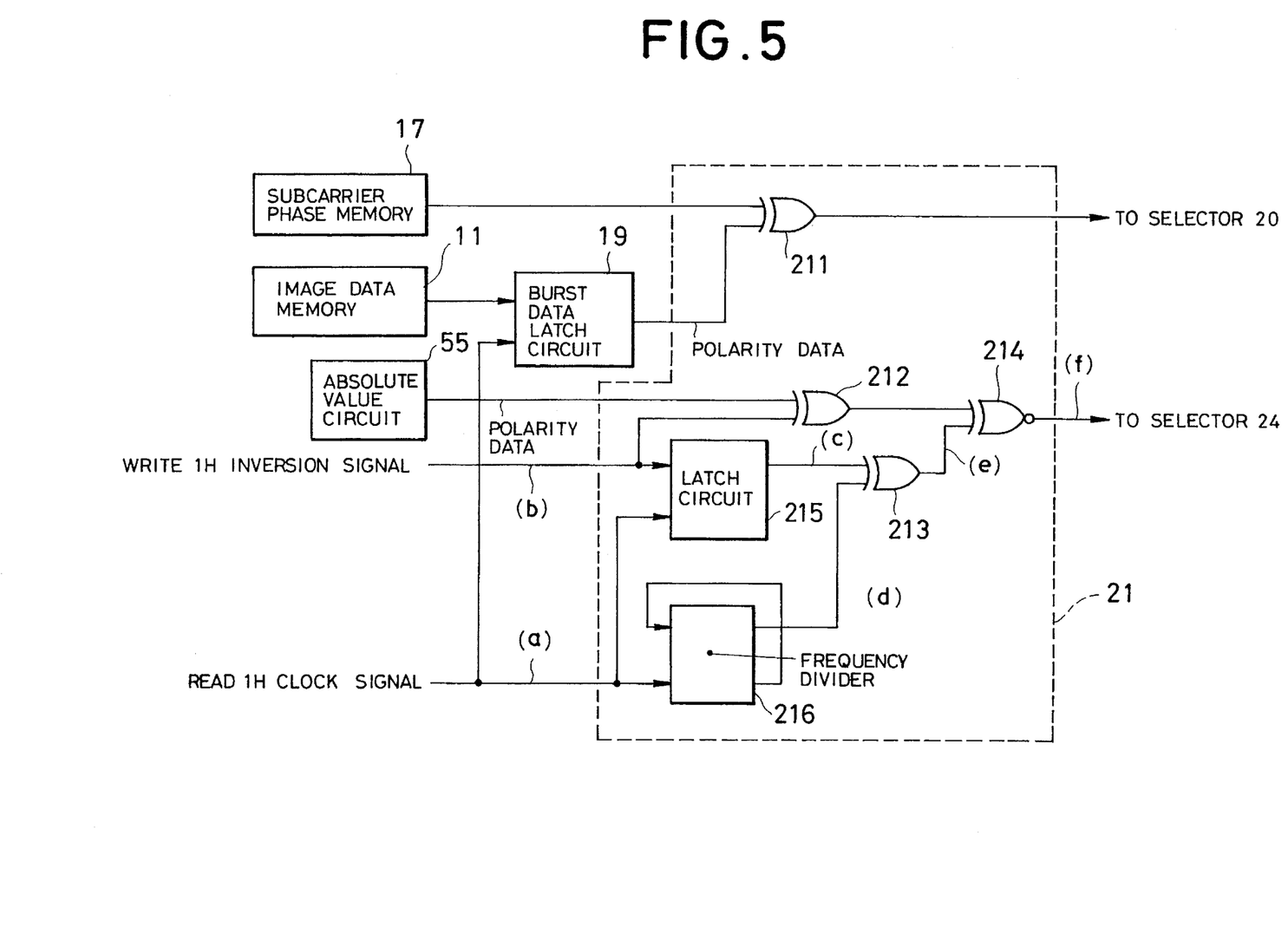
FIG. 5 is a block diagram specifically showing a subcarrier phase discontinuity detecting circuit.

As shown in FIG. 5, the subcarrier phase discontinuity detecting circuit 21 includes: three EX-OR circuits 211 to 213; an EX-NOR circuit 214; a latch circuit 215; and a frequency divider 216. The EX-0R circuit 211 discriminates whether the polarity data coincides or not by getting the exclusive OR between the polarity data outputted from the subcarrier phase memory 17 and the polarity data held in the burst data latch circuit 19. An output signal of the EX-OR circuit 211 is used as a selection signal of the selector 20. When the polarity data coincides, the selection signal allows the selector 20 to select the video data read out from the image data memory 11. When the polarity data does not coincide, the selection signal allows the selector 20 to select the video data whose color phase is inverted from the color phase inverting circuit 18.

The EX-OR circuit 212 obtains the exclusive OR between the polarity data obtained by the absolute value circuit 55 and the write 1H inversion signal generated by the write address generating circuit 13. An output signal of the EX-OR circuit 212 is supplied to one input of the EX-NOR circuit 214. The latch circuit 215 holds a level of the write 1H inversion signal generated by the write address generating circuit 13 in response to a front edge of the read 1H clock signal generated by the read address generating circuit 14. The frequency divider 216 forms a read 1H inversion signal by dividing the frequency of the foregoing read 1H clock signal to ½. The EX-OR circuit 213 obtains the exclusive OR between the level held in the latch circuit 215 and the read 1H inversion signal. The EX-NOR circuit 214 further negatively obtains the exclusive OR between the output signals of the EX-OR circuits 212 and 213.

The write address generating circuit 13 includes a counter (not shown) to count the number of write clock signals. The counter is reset in accordance with a vertical sync timing signal derived by separating from the video signal in a sync separating circuit (not shown) and repetitively counts, for example, up to 910 and generates a count value as write address data. The write address generating circuit 13 also forms the write 1H inversion signal, the burst timing signal to the latch circuit 54, the selection timing signal to the selector 10, and the vertical sync timing signal to the timing generating circuit 27 on the basis of the count value of the counter. The read address generating circuit 14 includes a counter (not shown) to count the number of constant read clock signals generated by the read clock signal generating circuit 16. The counter is also reset in accordance with the vertical sync timing signal in a manner similar to the counter of the write address generating circuit 13 and repetitively counts, for example, up to 910 and generates the count value as read address data. The read address generating circuit 14 forms the read 1H clock signal to the latch circuit 19 and the subcarrier phase discontinuity detecting circuit 21 on the basis of the count value of the counter.

Figure 6A:
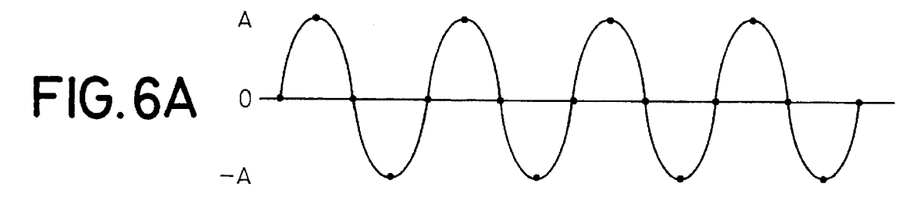
FIGS. 6A and 6B are diagrams showing waveforms of color burst signal components of two polarities.
Figure 6B:
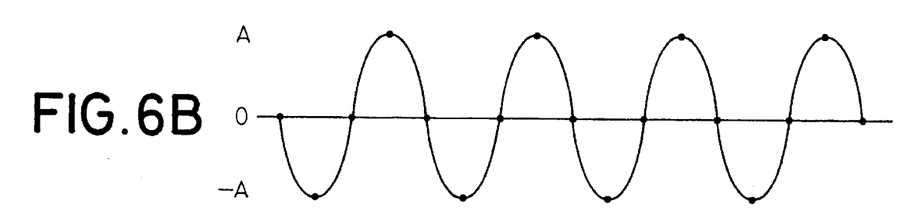

According to such a construction, the composite video signal demodulated by the FM detecting circuit 2 is supplied to the A/D converter 4 through the LPF 3, the digital video signal of eight bits is supplied from the A/D converter 4 to the burst extracting circuit 5 and selector 10. In the burst extracting circuit 5, the burst signals in the video signal of the number corresponding to only predetermined periods are accumulated in accordance with the sampling order by the subtracter 51 and two delay registers 52 and 53. Each of the subtracter 51 and the delay registers 52 and 53 has a signed ten-bit configuration. The sampled values of the burst signal are supplied to the subtracter 51 in a manner such that 0, A, 0, −A,0, A,0, . . . in one polarity as shown in FIG. 6A. In the other polarity, as shown in FIG. 6B, they are supplied such that 0, −A, 0, A,0, −A,0, . . . to the subtracter 51. In FIGS. 6A and 6B, each black point shows a sampling point and "A" denotes an amplitude level. The accumulation result is set to −8A at one polarity and is set to 8A at the other polarity. Code data (polarity data) of one bit and amplitude accumulation data of nine bits are held in the latch circuit 54 in accordance with the burst timing signal at the timing when four waves of the burst are accumulated. In the absolute value circuit 55, the amplitude accumulation data of nine bits is set to ⅛, the lower three bits are omitted, and the average amplitude data of six bits is derived. The most significant bit is used as polarity data and the average amplitude data of lower six bits is used as absolute value data. Since the amplitude of the burst signal is smaller than the other signal components, the burst signal can be sufficiently expressed by six bits.

Figure 7:
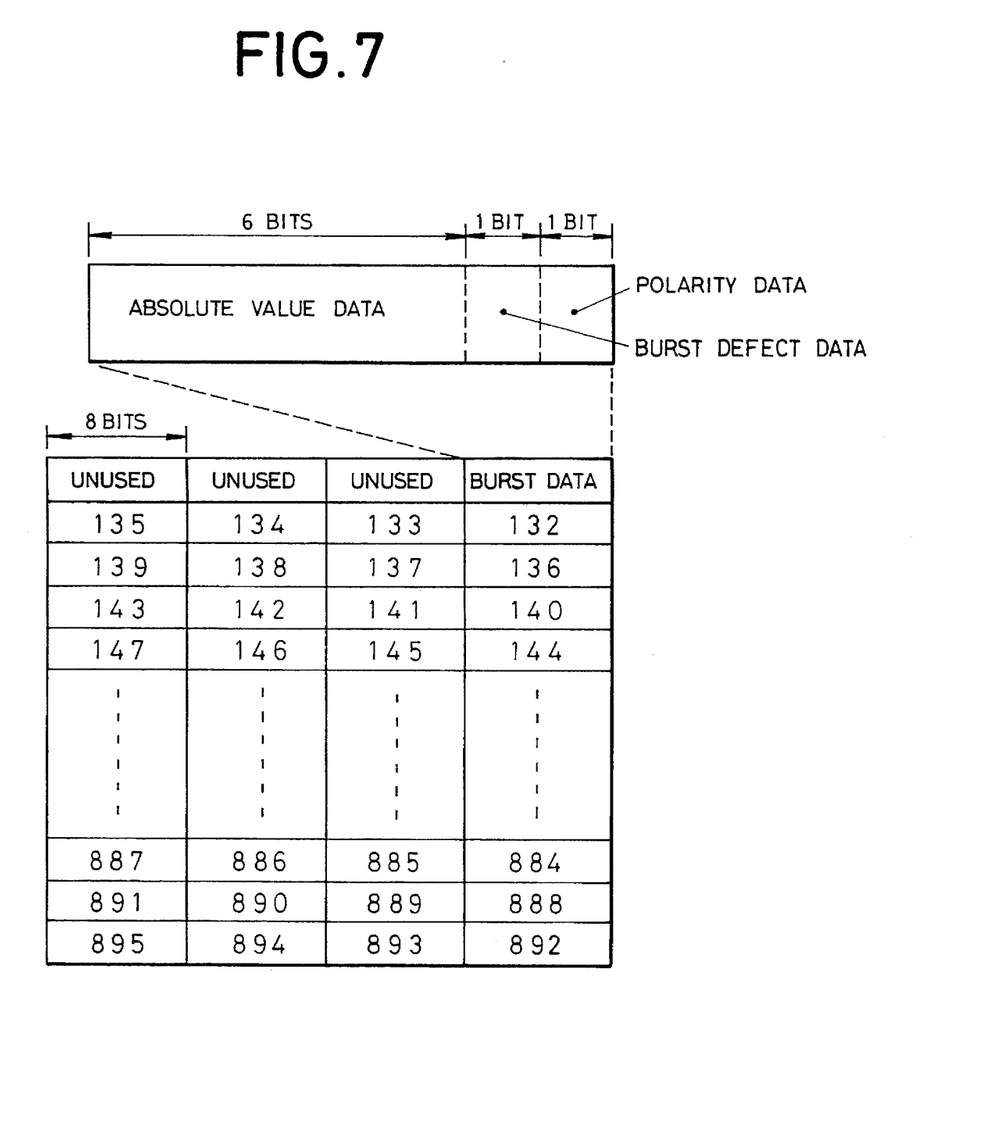
FIG. 7 is a diagram showing memory contents of an image data memory.

The selector 10 relays and generates the data regarding the burst signal to the image data memory 11 in accordance with the order of the absolute value data, polarity data, and burst defect data in response to the selection timing signal every 1H. In the residual period of time within 1H, the selector 10 relays and generates the video data from the A/D converter 4 to the image data memory 11. The data supplied from the selector 10 is written in the image data memory 11 in accordance with the write signal from the write/read control circuit 12. The writing position of the image data memory 11 is designated by the write address data generated by the write address generating circuit 13. As for the image data, data from the 132nd pixel to the 895th pixel which actually forms a screen portion is written. Each data is, therefore, written in the image data memory 11 as shown in FIG. 7. In FIG. 7, reference numerals in frames indicate pixel numbers. In the writing mode of the image data from the 132nd pixel to the 895th pixel, the polarity data held in the absolute value circuit 55 is written at the memory locations in the subcarrier phase memory 17 which are sequentially designated in accordance with the write signal from the write/read control circuit 12.

The read addresses are sequentially designated for the image data memory 11 and subcarrier phase memory 17 in accordance with the read signal from the write/read control circuit 12 and the data is read out from each address. The absolute value data, polarity data, and burst defect data are first read out every 1H from the image data memory 11. After that, the video data from the 132nd pixel to the 895th pixel is read out one pixel by one. The polarity data is sequentially read out from the subcarrier phase memory 17 synchronously with the reading operation of the video data.

The absolute value data, polarity data, and burst defect data read out from the image data memory 11 are supplied to the burst data latch circuit 19. When the burst defect data does not show the generation of the drop-out for the burst signal, the absolute value data and the polarity data are held in the FFs 192 and 191 of the burst data latch circuit 19, respectively. The held absolute value data is directly supplied to the selector 221 and is also supplied to the selector 221 through the multiplier 223. In addition to the absolute value data read out from the image data memory 11 and the data in which the absolute value data is set to a negative value, the reference level data indicative of 0 level is also supplied to the selector 221. The polarity data held in the latch circuit 19 is supplied to the timing generating circuit 225. The timing generating circuit 225 generates a first selection timing signal for changing the selecting order of the selector 221 at the timing synchronized with the read clock signal in accordance with the polarity indicated by the polarity data. In case of one polarity shown in FIG. 6A, the switching operation of the selector 221 is controlled in a manner such that 0, A,0, −A,0, A,0, . . . In case of the other polarity shown in FIG. 6B, the switching operation of the selector 221 is controlled such that 0, −A,0, A,0, −A,0, . . . . The data outputted from the selector 221 is added to the pedestal data by the adder 224 and, after that, the resultant data is supplied as burst data to the selector 222.

The video data read out from the image data memory 11 is supplied to the selector 222 through the selector 20. In the selector 222, the burst data or image data is relayed in accordance with a second selection timing signal from the timing generating circuit 225. That is, the burst data from the adder 224 is relayed and outputted in correspondence to the position within 1H where the burst signal exists and the image data is relayed and generated in correspondence to the position within 1H where the video signal from the 132nd pixel to the 895th pixel exists. As mentioned above, the image data which is relayed from the selector 222 and includes the burst component is supplied to the sync signal and pedestal level inserting circuit 25 through the selector 24. The sync signal and pedestal inserting circuit 25 adds the horizontal and vertical sync components and the pedestal component to the video data including the burst component, thereby forming a digital composite video signal. The digital composite video signal is converted to the analog composite video signal by the D/A converter 26 and is supplied to a television receiver (not shown).

The above operations denote a case where the drop-out does not occur in the demodulated video signal. On the other hand, when the drop-out detecting circuit 15 detects the drop-out from the demodulated video signal, a drop-out detection signal is supplied from the drop-out detecting circuit 15 to the write/read control circuit 12. The write/read control circuit 12 stops the writing operation to the image data memory 11 and subcarrier phase memory 17 in accordance with the drop-out detection signal. The video data is not written at the memory location in the image data memory 11 which was designated at that time and the video data which has already been written is held. On the other hand, the polarity data is not written at the memory location in the subcarrier phase memory 17 which was designated at the time and the polarity data which has already been written is held. That is, since the video data and polarity data of 1H before are stored at the memory locations designated by the write address data, the video data and polarity data of 1H before are held as they are in the period of time of the drop-out.

Figure 8A:
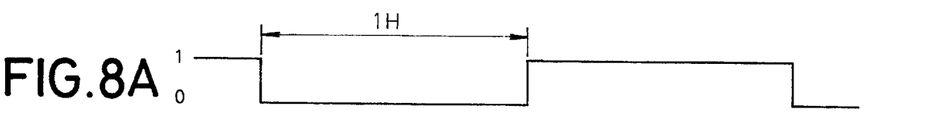
FIGS. 8A, 8B, and 8C are waveform diagrams each showing the operation when a drop-out occurs.
Figure 8B:
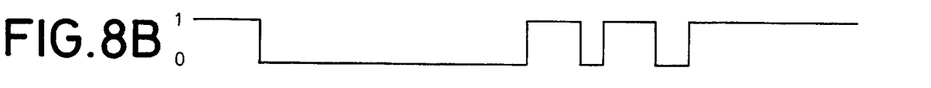
Figure 8C:
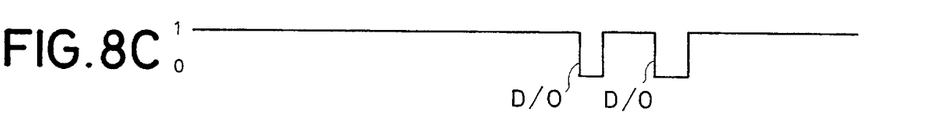

The polarity data which is outputted from the absolute value circuit 55 is inverted every 1H as shown in FIG. 8A. The polarity data which changes as mentioned above is written as one of the data with respect to the burst signal into the image data memory 11. The polarity data which is outputted from the absolute value circuit 55 is written as same data in 1H synchronously with the write clock signal in the subcarrier phase memory 17. FIG. 8B continuously shows the polarity data written in the subcarrier phase memory 17 in accordance with the order of addresses. When the drop-out detection signal is generated from the drop-out detecting circuit 15 as shown by D/O in FIG. 8C, however, since the writing operation by the write/read control circuit 12 is stopped, the data of 1H before is held at the memory location designated by the write address data at that time.

All of the polarity data held in the burst data latch circuit 19 and the polarity data which was sequentially read out from the subcarrier phase memory 17 coincide in 1H during which the drop-out detection signal is not generated, so that a low level signal is generated from the EX-OR circuit 211. The low level signal allows the selector 20 to delay the read image data from the image data memory 11. On the other hand, in the 1H in which the drop-out detection signal is generated, there occurs a situation such that the polarity data which is sequentially read out from the subcarrier phase memory 17 does not coincide with the polarity data held in the burst data latch circuit 19. If the polarity data does not coincide, a high level signal is generated from the EX-OR circuit 211 and the high level signal allows the selector 20 to delay the color phase inverted video data from the color phase inverting circuit 18. Since the video data of 1H before is read out from the image data memory 11 in the portion in which the drop-out occurs, the phase of the video data is inverted by 180°, the resultant data is outputted, therefore, the phase inverting condition of the color signal at every 1H is maintained.

If the drop-out occurs in the burst signal, the burst defect data indicates the generation of the drop-out and is written in the image data memory 11. The burst defect data is set to 1 when no drop-out occurs and is set to 0 when the drop-out occurs. When the polarity data and burst defect data are read out from the image data memory 11, so long as the read-out burst defect data is equal to 0, the read-out polarity data and absolute value data are not held in the FFs 191 and 192 in the burst data latch circuit 19. The FF 192 holds the absolute value data of 1H before which has been held so far as it is. Since the change-over switch 194 relays output data of the invertor 193 to one input terminal of the FF 191 in accordance with the burst defect data, the FF 191 holds and generates the data obtained by inverting "01" of the polarity data of 1H before. Since the absolute value data of 1H before and the polarity data indicative of the phase opposite to that of the data of 1H before are supplied to the burst inserting circuit 22, the burst data outputted from the adder 224 satisfies the phase inverting condition at every 1H and also shows a proper amplitude.

Figure 9A:
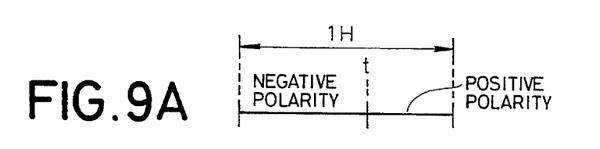
FIGS. 9A, 9B, and 9C are diagrams each showing the operation in a state in which a reading position is advanced from a writing position in the image data memory.
Figure 9B:
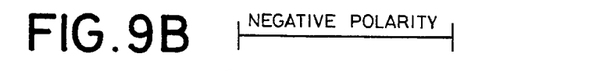
Figure 9C:
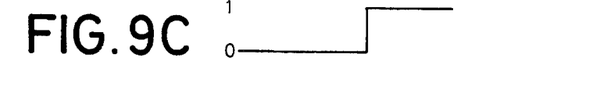

Although the frequency of the write clock signal is fluctuated by the jitter included in the demodulated video signal, since the read clock signal has a predetermined period, a case where the reading position is advanced from the writing position in each of the image data memory 11 and subcarrier phase memory 17 occurs. When the reading position is advanced from the writing position during 1H, the polarity data which is read out from the subcarrier phase memory 17 is set to the data of the previous line (horizontal scan line). For instance, as shown in FIG. 9A, the polarity indicated by the polarity data is inverted at a time point (t) at which the reading position outruns the writing position. The polarity data differs from the polarity data of the present line held in the burst data latch circuit 19 (FIG. 9B). Since the high level signal is generated from the EX-OR circuit 211 as shown in FIG. 9C in a manner similar to the case of the drop-out, therefore, the color phase inverted video data from the color phase inverting circuit 18 is supplied to the sync signal and pedestal level inserting circuit 25 through the selectors 20 and 222 and, further, selector 24. The video data of 1H before is read out from the image data memory 11 in the portion in which the reading position is advanced from the writing position during 1H, the phase of the video data is inverted by 180°, and the resultant data is outputted. The phase inverting condition of the color signal at every 1H is, consequently, maintained.

In a situation such that the reading position is advanced from the writing position, when the reading system starts the reading operation of the video data for the next line, the read 1H clock signal is generated before the polarity data in the image data memory 11 is rewritten. The polarity data held in the burst data latch circuit 19 is, therefore, the same data as that of the previous line in accordance with the read 1H clock signal. The burst data which is generated form the adder 224 of the burst inserting circuit 22 is, therefore, formed by the same data of the previous line without inverting the phase. The polarity data which is read out from the subcarrier phase memory 17 is, further, also the data of the previous line because the data is read out before new polarity data is written. The low level signal is, therefore, generated from the EX-OR circuit 211 and allows the selector 20 to delay the read-out image data from the image data memory 11 to the selector 222. In a state in which the reading position is advanced from the writing position, when the reading system starts the reading operation for scanning the next line, the image data including the burst component in which the phase of the subcarrier is not inverted is relayed from the selector 222.

Figure 10A:
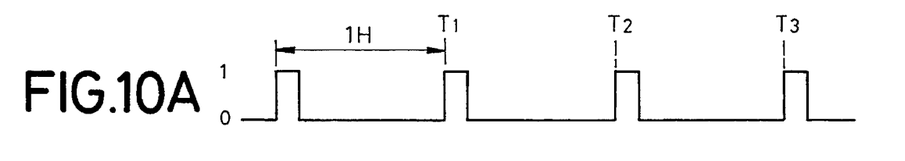
FIGS. 10A to 10G are diagrams each showing the operation in a state in which the reading position is advanced from the writing position in the image data memory.
Figure 10B:
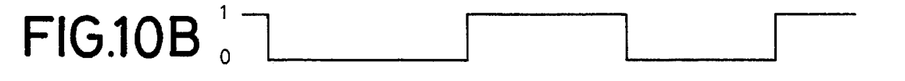
Figure 10C:
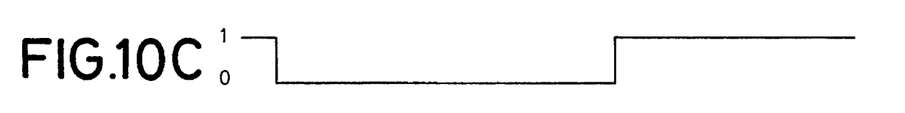
Figure 10D:
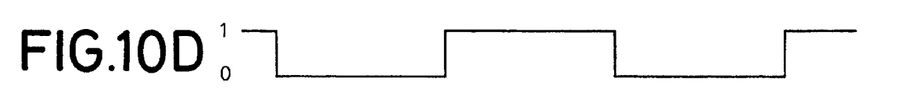
Figure 10E:
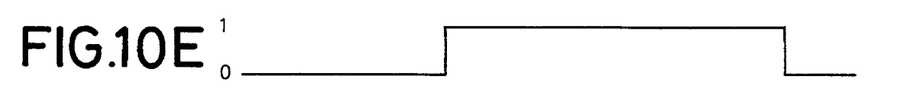
Figure 10F:
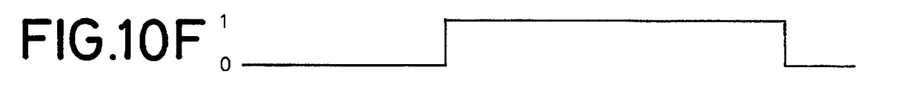
Figure 10G:
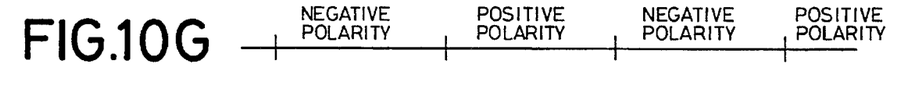

In order to cope with such an inconvenience, the present digital time base corrector operates as follows. The latch circuit 215 holds the level of the write 1H inversion signal in accordance with the leading edge of the read 1H clock signal. The read 1H clock signal is a pulse signal having a predetermined period as shown in FIG. 10A. On the other hand, the write 1H inversion signal is a signal whose level is inverted every 1H as shown in FIG. 10B and is also a signal in which the duration of 1H is fluctuated by the jitter component. In the state in which the writing position is advanced from the reading position, therefore, the time point at which the read 1H clock signal rises is just after the level of the write 1H inversion signal was inverted. In the state in which the reading position is advanced from the writing position, however, as shown in FIGS. 10A to 10G, the level of the write 1H inversion signal is not inverted at a time point $T_1$ at which the read 1H clock signal rises. The latch circuit 215 holds the same level as that of the preceding time point at which the read 1H clock signal rises as shown in FIG. 10C. Since the level of the read 1H inversion signal which is generated from the frequency divider 216 is inverted at the time point T₁ as shown in FIG. 10D, two input levels of the EX-OR circuit 213 differ. At the time point T₁, the EX-OR circuit 213 generates the high level signal as shown in FIG. 10E and supplies to one input of the EX-NOR circuit 214. In the EX-OR circuit 212 for supplying the signal to the other input of the EX-OR circuit 212, so long as the phase of the subcarrier of the demodulated video signal is inverted every 1H, the levels of the polarity data from the absolute value circuit 55 and write 1H inversion signal which are supplied coincide, so that the low level signal is generated. At the time point T₁, therefore, the output of the EX-NOR circuit 214 is set to the high level as shown in FIG. 10F. The selector 24 is switched to a state in which the output signal of the color phase inverting circuit 23 is relayed and outputted in accordance with the high level. Since the phase of the image data including the burst component relayed from the selector 222 is inverted by the color phase inverting circuit 23, even when the reading system starts the reading operation of the video data for the next line in a state in which the reading position is advanced from the writing position, the phase inverting condition of the color signal at every 1H is maintained, for example, as shown in FIG. 10G.

In the case where the reading system starts the reading operation of the video data for the further next line at a time point T₂ shown in FIGS. 10A to 10G in a state in which the reading position is advanced from the writing position, since the output of the EX-NOR circuit 214 is set to the high level by the foregoing operation, the selector 24 relays and generates the output signal of the color phase inverting circuit 23. The phase of the image data including the burst component relayed from the selector 222 is inverted by the color phase inverting circuit 23.

At a time point T₃ shown in FIGS. 10A to 10G, since the operating state is returned to the state in which the writing position is advanced from the reading position and the reading system starts the reading operation of the video data for the further next line, the selector 24 relays and generates the output signal of the burst inserting circuit 22. The image data which includes the burst component and was relayed from the selector 222 is added as it is with the sync and pedestal components and, after that, the resultant data is outputted as a reproduction video signal from the D/A converter 26.

In the above embodiment, although the image data memory 11 and subcarrier phase memory 17 are individually provided, it will be obviously understood that those memories can be provided as a single memory. Although the burst data such as polarity data or the like obtained by the burst extracting circuit 5 has been written in the image data memory 11, it is sufficient to write it into another memory.

As mentioned above, according to the digital time base corrector of the present invention, when the read address is advanced from the write address in the image data memory and subcarrier phase memory within one horizontal scan period, a discrepancy occurs between the polarity data read out from the subcarrier phase memory and the proper polarity data held in the latch means. When the discrepancy is detected, the color phase of the read-out image data is inverted. In the case where the data reading operation for a new horizontal scan period is started from one horizontal scan period, when a situation such that the operating mode is not shifted to the data writing operation for the new horizontal scan period is detected, the color phase of the read-out image data is inverted in the new horizontal scan period. In the case where the storage capacity of the memory is reduced to a value of about 1H of the video signal, accordingly, even when the writing operation to the memory is delayed by the jitter included in the demodulated video signal, the interleave relation between the luminance signal and color signal of the video signal can be held, thereby preventing that an adverse influence such as a stripe pattern or the like occurs on the screen.

What is claimed is:

1. A digital time base corrector comprising:

A/D converting means for sampling a color video signal which was read out and reproduced from a recording medium and for converting said color video signal into a digital signal;

polarity data generating means for generating polarity data indicative of a polarity of a burst signal from said digital signal at every horizontal scan period;

an image data memory for storing said digital signal as image data on a sample unit basis at every horizontal scan period;

a subcarrier phase memory having memory locations of said polarity data of the number as many as only the number of said image data to be written into said image data memory;

memory control means for controlling writing of said image data at memory locations in said image data memory which are sequentially designated in accordance with a write clock signal whose phase is synchronized with a time base fluctuation included in said color video signal, for controlling writing of said polarity data at memory locations in said subcarrier phase memory which are sequentially designated in accordance with said write clock signal, for controlling reading of said image data from the memory locations in said image data memory which are sequentially designated in accordance with a read clock signal of a predetermined period, and for controlling reading of said polarity data from the memory locations in said subcarrier phase memory which are sequentially designated in accordance with said read clock signal;

latch means for holding and outputting said polarity data read from said image data memory during a reading operation period of said memory control means corresponding to a horizontal scan period in which said polarity data is generated by said polarity data generating means;

first discrepancy detecting means for generating a first discrepancy detection signal when a discrepancy between said polarity data read out by said memory control means and the polarity data held in said latch means is detected;

second discrepancy detecting means for generating a second discrepancy detection signal for a new horizontal scan period when it is detected that said memory control means is not shifted to a data writing operation in said new horizontal scan period in the case where said memory control means starts a data reading operation from said image data memory and said subcarrier phase memory for said new horizontal scan period;

color phase inverting means for relaying said image data read out by said memory control means, for inverting a color phase of said image data read out by said memory control means in accordance with said first or second discrepancy detection signal, and for relaying said color phase inverted image data; and means for generating an analog video signal on the basis of said image data which is outputted from said color phase inverting means.

2. A digital time base corrector according to claim 1, wherein said second discrepancy detecting means comprises:

means for generating a write 1H inversion signal whose level is inverted every data writing operation for one horizontal scan period by said memory control means;

means for generating a read 1H inversion signal whose level is inverted every data reading operation in one horizontal scan period by said memory control means; and means for generating said second discrepancy detection signal when levels of said write 1H inversion signal and said read 1H inversion signal don't coincide.

* * * * *